US007590770B2

(12) United States Patent
Mandrell et al.

(10) Patent No.: US 7,590,770 B2
(45) Date of Patent: Sep. 15, 2009

(54) DEVICE-INDEPENDENT CONTROL OF STORAGE HARDWARE USING SCSI ENCLOSURE SERVICES

(75) Inventors: Jon Kelly Dean Mandrell, Costa Mesa, CA (US); Earl Leon Bushman, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 299 days.

(21) Appl. No.: 11/009,302

(22) Filed: Dec. 10, 2004

(65) Prior Publication Data
US 2006/0143543 A1   Jun. 29, 2006

(51) Int. Cl.
G06F 3/00 (2006.01)
G01R 31/28 (2006.01)
(52) U.S. Cl. .......................................... 710/9; 714/712
(58) Field of Classification Search ............... 710/9; 714/712
See application file for complete search history.

(56) References Cited
U.S. PATENT DOCUMENTS
6,148,349 A * 11/2000 Chow et al. ................ 710/33
6,950,263 B2 * 9/2005 Suzuki et al. ............... 360/69
2002/0010883 A1 * 1/2002 Coffey et al. .............. 714/712
2004/0088455 A1 * 5/2004 Smith et al. ................. 710/72

OTHER PUBLICATIONS
API Definition by Compact American Dictionary of Computer Words, 1995, www.xreferplus.com.*
API Definition by John Wiley & Sons Ltd, 1999, www.xreferplus.com.*
HAL Definition by IEEE, 2001, www.xreferplus.com.*

* cited by examiner

Primary Examiner—Henry W. H. Tsai
Assistant Examiner—Hyun Nam
(74) Attorney, Agent, or Firm—Morrison & Foerster LLP

(57) ABSTRACT

A SES API is disclosed as an interface between SES protocol code and non-SCSI storage enclosure hardware to abstract the SES protocol code from the control of the hardware. To control the hardware, SES commands are sent to the SES protocol code. The SES protocol code is responsive to the SES commands, but has no knowledge of the hardware. The SES protocol code converts the SES command to a series of function calls. When the SES API receives the function calls, it executes the corresponding functions. The SES API includes a customer-tailored interface library of functions. The library allows the end user to provide the hardware interface routines necessary for SES to control the hardware. The functions are written as templates, separate from the SES protocol code, so that end users can modify the functions to control the hardware without having to modify or understand the SES protocol code.

12 Claims, 4 Drawing Sheets

DEVICE-INDEPENDENT CONTROL OF STORAGE HARDWARE USING SCSI ENCLOSURE SERVICES

BACKGROUND OF THE INVENTION

1. Field of the Invention

The present invention relates, generally, to the configuration of hardware in storage enclosures, and in particular embodiments, to the abstracted control of storage enclosure hardware using the Small Computer System Interface (SCSI) Enclosure Services (SES) protocol.

2. Description of Related Art

FIG. 1 illustrates an exemplary conventional system environment 100. In FIG. 1, an initiator such as a host computer 102, including an input/output (I/O) controller such as a Host Bus Adapter (HBA) 104, is connected to a storage system 106 via an Ethernet or Local Area Network (LAN) or storage area network (SAN) 108 implementing a protocol such as Fibre Channel (FC). Storage system 106 includes one or more storage controllers such as Redundant Array of Independent Disks (RAID) controllers 112, and mass storage capability such as a RAID 110, which may include multiple storage enclosures referred to as SBODs (Switched Bunch Of Disks) 114, each containing multiple disk drives 132, a crossbar switch 124, a processor 126, and a variety of non-SCSI storage enclosure hardware 128. The crossbar switch 124 provides ports for direct connections to each of the drives 132 within each SBOD 114.

The RAID controllers 112 virtualize the SBODs 114 such that an initiator 102 on a front end 116 of a RAID controller 112 need not be concerned with how the RAID 110 is configured on a back end 118 of the RAID controller 112. For example, the host 102 may send a command 122 to the front end 116 of a RAID controller 112, such as a request to store data. The RAID controller 112 responds to this command 122 by initiating one or more write commands 120 on the back end 118 of the RAID controllers 112 according to a protocol such as a FC Arbitrated Loop (FCAL) protocol, wherein one command is required for each drive in one or more SBODs 114 that will store some of the requested data. Each command in the series of commands must pass serially through each crossbar switch 124 on each SBOD 114, which are daisy-chained together using dedicated FC lines 130, until the crossbar switch connected to the targeted drive is located.

FIG. 2 illustrates another exemplary conventional system environment 200. In FIG. 2, the initiator 202, which includes an I/O controller such as a HBA 204, is connected to a storage system 206 via an Ethernet or LAN or SAN 208 implementing a protocol such as FC. Storage system 206 includes one or more storage controllers such as RAID controllers 212, a root switch 234, and mass storage capability such as a RAID 210, which may include multiple storage enclosures referred to as JBODs (Just a Bunch Of Disks) 214, each containing multiple disk drives 232 connected in a loop. Root switch 234 includes a non-blocking crossbar switch 224, a processor 226, and a variety of non-SCSI storage enclosure hardware 228. The crossbar switch 224 provides ports for direct connections to each of the JBODs 214.

The RAID controllers 212 virtualize the JBODs 214 such that an initiator 202 on a front end 216 of a RAID controller 212 need not be concerned with how the RAID 210 is configured on a back end 218 of the RAID controller 212. For example, the initiator 202 may send a command 222 to the front end 216 of a RAID controller 212, such as a request to store data. The RAID controller 212 responds to this command 222 by initiating one or more write commands 220 on the back end 218 of the RAID controllers 212 according to a protocol such as FCAL, wherein one command is required for each drive in one or more JBODs 114 that will store some of the requested data. Dual FC lines 230 may be provided for each connection (e.g. channel A and B) for redundancy. Each command in the series of commands must pass through crossbar switch 224 in root switch 234, which then makes the proper connection to route the commands directly the JBOD containing the targeted drive. The commands are then routed serially through each of the drives 232 in a loop in the JBOD 214 until the proper drive is located.

The various devices in the SBODs 114 of FIG. 1 or the root switch 234 of FIG. 2 need to be configured, including the non-SCSI storage enclosure hardware. In addition, these devices and hardware may store configuration information, statistics, and other information that may be of use to an end user of the storage system. Therefore, the SBODs 114 in FIG. 1 and the root switch 234 in FIG. 2 may include Ethernet ports (see reference character 136 in FIG. 1 and reference character 236 in FIG. 2) and perhaps RS-232 serial ports (see reference character 138 in FIG. 1 and reference character 238 in FIG. 2) to provide a management interface. However, in either case, an external connector and an external connection are required to configure the elements in the storage systems.

SCSI Enclosure Services (SES) is a protocol that has been developed to enable both SCSI and non-SCSI devices to be configured, monitored and controlled over a FC link. Essentially, SES comprises SCSI commands embedded in the FC protocol. The SES protocol is extensible and flexible to support the configuration and control of many different SCSI devices in an enclosure. Through the use of SES commands, an end user may operate a SES initiator such as a RAID controller or an HBA separate from the RAID controller to configure, monitor and control the devices within the SBODs 114 in FIG. 1 or the root switch 234 in FIG. 2 over the FC connections between the RAID controller and the SBODs or root switch.

FIG. 3 illustrates an exemplary conventional storage system 300 that is configurable using SES commands. In FIG. 3, a Vitesse® VSC120 enclosure management controller 302 including a processor 326 is connected to drives 332 via port bypass circuits (PBCs) 372 in an SBOD implementation 314. Non-SCSI hardware 328 may comprise a number of devices, including, but not limited to, one or more fans or cooling devices 348, power supplies 350, temperature sensors 352, and lights, displays or indicators 354.

To configure the hardware 328, SES commands 356 are sent from a SES initiator such as a RAID controller 312 over the FC connection 330 directly to one of two FC ports 382 on the Vitesse® VSC120 enclosure management controller 302. The FC ports 382 allow the VCS 120 to function as a SES device provided that the appropriate software is loaded. The SES commands 356 are SCSI commands embedded in the FC protocol, and configure, monitor and control the hardware 328 within the SBOD 314. SES protocol code 362 executed by the processor 326 converts the SES commands 356 into signaling that may be sent over pre-defined hardware interface 360 for configuring, monitoring and controlling the non-SCSI hardware 328. However, because the SES protocol code 362 requires special code to configure, monitor and control the non-SCSI hardware 328, the SES protocol code 362 must be modified with specific knowledge of the actual non-SCSI hardware in the storage enclosure and an understanding of SES protocols. No pre-defined template for controlling non-SCSI hardware is provided, other than a very rudimentary set of functions that must be used when writing the special code to control the non-SCSI hardware. In addition, this Vitesse®

VSC120 implementation allows no flexibility in the choice of processor, and does not allow for the defining of a new hardware interface if a previously unknown non-SCSI hardware device was inserted into the storage system.

Therefore, there is a need to abstract the SES protocol code from the control, monitoring and configuration of the non-SCSI storage enclosure hardware, to allow a choice of processor, and to enable the defining of new hardware interfaces.

SUMMARY OF THE INVENTION

The present invention is directed to abstracting the configuration, monitoring and control of non-SCSI storage enclosure hardware from SES protocol code. This is accomplished using a SES API as an interface between the SES protocol code and the non-SCSI storage enclosure hardware to abstract the SES protocol code from the configuration, monitoring and control of non-SCSI storage enclosure hardware.

A storage enclosure typically includes a non-blocking crossbar switch, devices such as disk drives, a processor, and non-SCSI storage enclosure hardware. The processor includes a switch API, which is source code and hardware drivers that allows the processor to make and receive function calls, control the crossbar switch, and generally communicate with the crossbar switch. The processor also includes a customer application for controlling the operation of the crossbar switch.

To configure, monitor and control the non-SCSI storage enclosure hardware, SES commands are sent from a SES initiator over a FC connection to the crossbar switch via a FC port. The SES commands are SCSI commands embedded in the FC protocol, and may be used to manage and sense the state of the non-SCSI storage enclosure hardware. The SES commands are then routed to an internal port on crossbar switch, which is connected to the switch API in the processor. The switch API then receives the SES commands from the crossbar switch, and forwards the SES commands to SES protocol code being executed by the processor.

In general, the SES protocol code enables the processor to appear as a SES device to the SES initiator. The SES protocol code understands the SCSI protocol and how to transport information across a FC link, and is responsive to the SES commands. In particular, the SES protocol code defines 21 devices with specific operational capabilities that can be controlled. There are also a group of end user defined devices that the end user can tailor to configure, monitor and control any type of hardware in the storage enclosure.

The SES protocol code has no knowledge of the specific non-SCSI storage enclosure hardware, and is therefore not capable of directly configuring, monitoring or controlling the non-SCSI storage enclosure hardware. However, this specific knowledge is not necessary. To perform the operation specified by a SES command, the SES protocol code converts the SES command to a series of C function calls. This set of C function calls make up the SES API. When the SES API C function is called from the SES protocol code, it executes the corresponding functions, which have been tailored for the specific hardware in the storage enclosure. For example, the functions may request certain data from a specific piece of non-SCSI storage enclosure hardware. When the data is returned by the C function, the data is passed back to the SES protocol code, which then prepares SES commands containing the data. These SES commands are sent back to the SES initiator via the switch API and the crossbar switch.

The SES API is a customer-tailored interface library of C functions. This library allows the end user to specify to the SES protocol code what non-SCSI hardware devices are supported and what state they are in (e.g. alerts, values, existence). The library also allows the end user to provide the hardware interface routines necessary for SES to control their implementation in the storage enclosure. The functions in the SES API are written as templates or starting points, separate from the SES protocol code, so that end users can modify the functions in the SES API to communicate with and control the particular non-SCSI storage enclosure hardware in the hardware enclosure, without having to modify or even understand the SES protocol code. In addition to a set of defined function calls, there is a group of get and set vendor-defined functions that can be modified for use with any type of hardware. When data is returned from one of these functions, the SES protocol code does not know what the data represents, but it sends it back anyway.

One of the advantages of this invention (the user-configurable SES API) is its upgradeability. Once the end user has invested the time to modify the template and generate functions specific to particular hardware, the processor and crossbar switch may be upgraded, and yet the same tailored SES API can be used with those upgraded devices to configure, monitor and control the same storage enclosure hardware. Another advantage is that the SES protocol code further allows an end user to verify that the SES initiator "sees" the processor as a SES device. Once the storage enclosure is connected to the SES initiator, an end user can verify that the processor appears as a SES device to the SES initiator. This step enables the end user to verify that a functioning SES device exists, and that the FC link to that device is also operational. Thereafter, functionality can be added to the SES API to enable it to control and configure the non-SCSI storage enclosure hardware, confident that the SES protocol code is operational. Yet another advantage is that because the processor relies on the crossbar switch to provide a connection to the FC link, the processor need not have FC ports, and it can be substantially less expensive than other processors previously used. In addition, because the control of the non-SCSI storage enclosure hardware is implemented in firmware, a processor may be chosen for the hardware enclosure that fits the particular application.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are directed to abstracting the configuration, monitoring and control of non-SCSI storage enclosure hardware from SES protocol code. This is accomplished using a SES API as an interface between the SES protocol code and the non-SCSI storage enclosure hardware.

Figure 1:
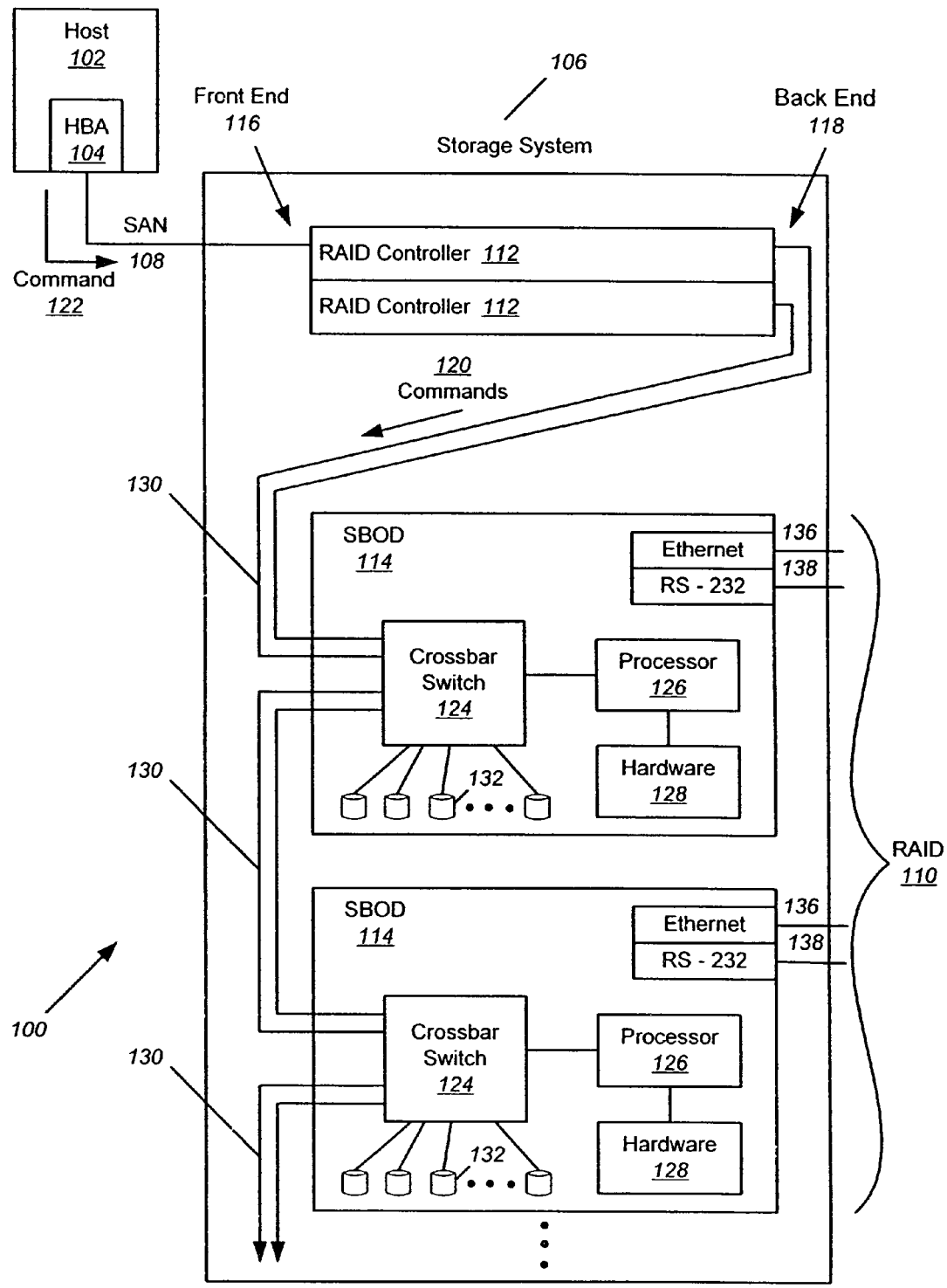
FIG. 1 illustrates an exemplary conventional system environment including an SBOD configuration of storage devices.
Figure 2:
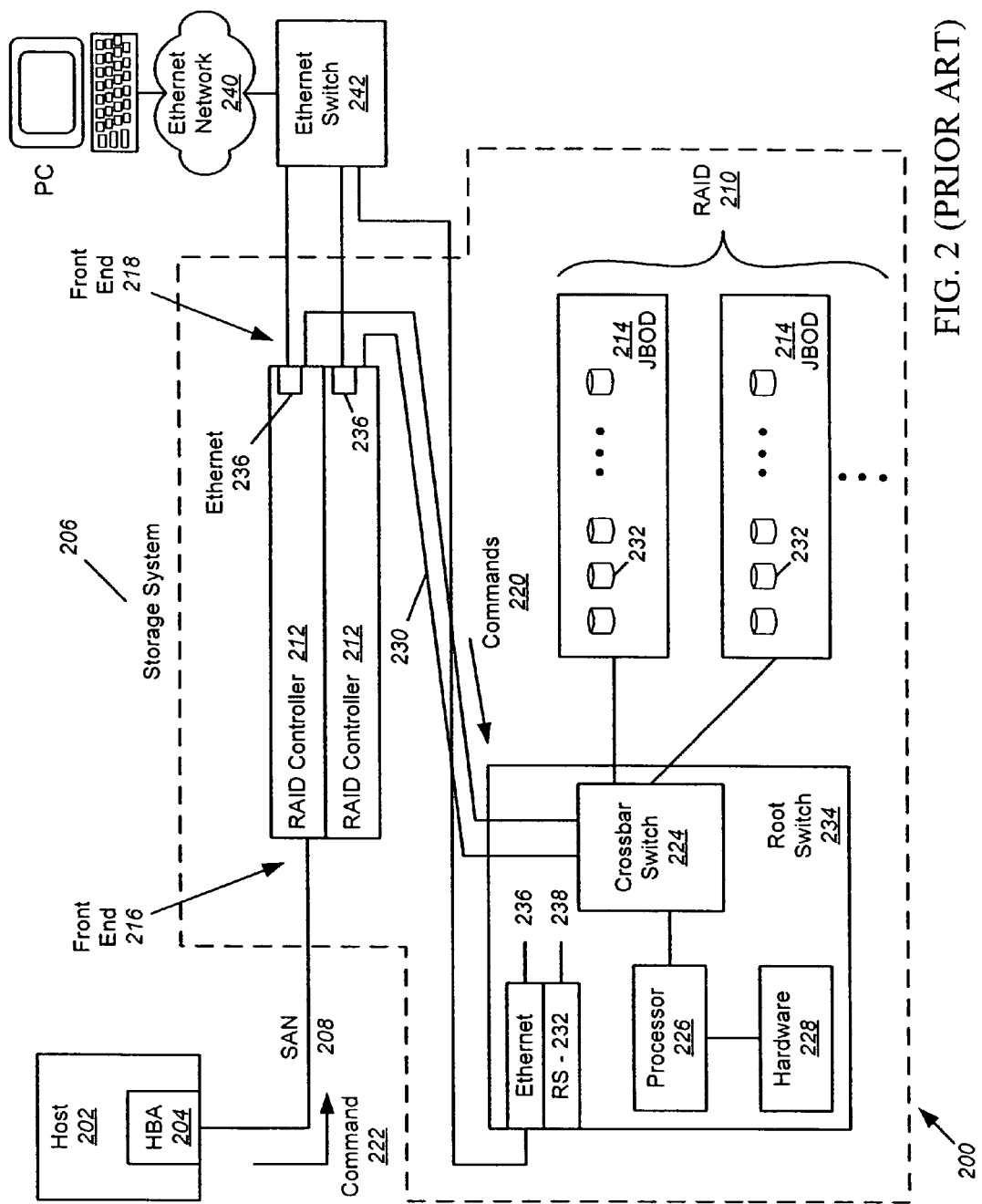
FIG. 2 illustrates an exemplary conventional system environment including a root switch configuration of storage devices.
Figure 3:
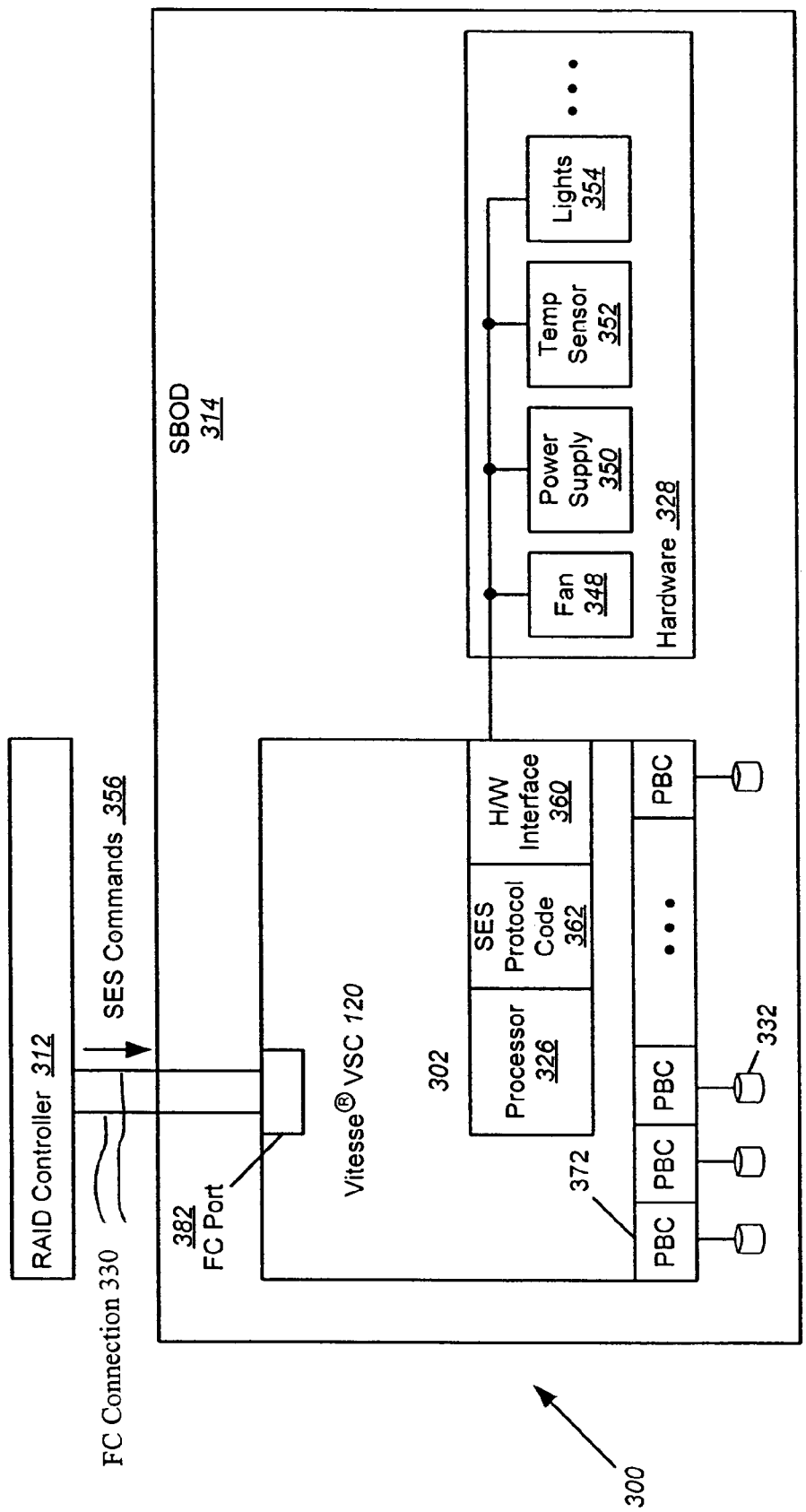
FIG. 3 illustrates an exemplary conventional storage system that is configurable using SES commands.
Figure 4:
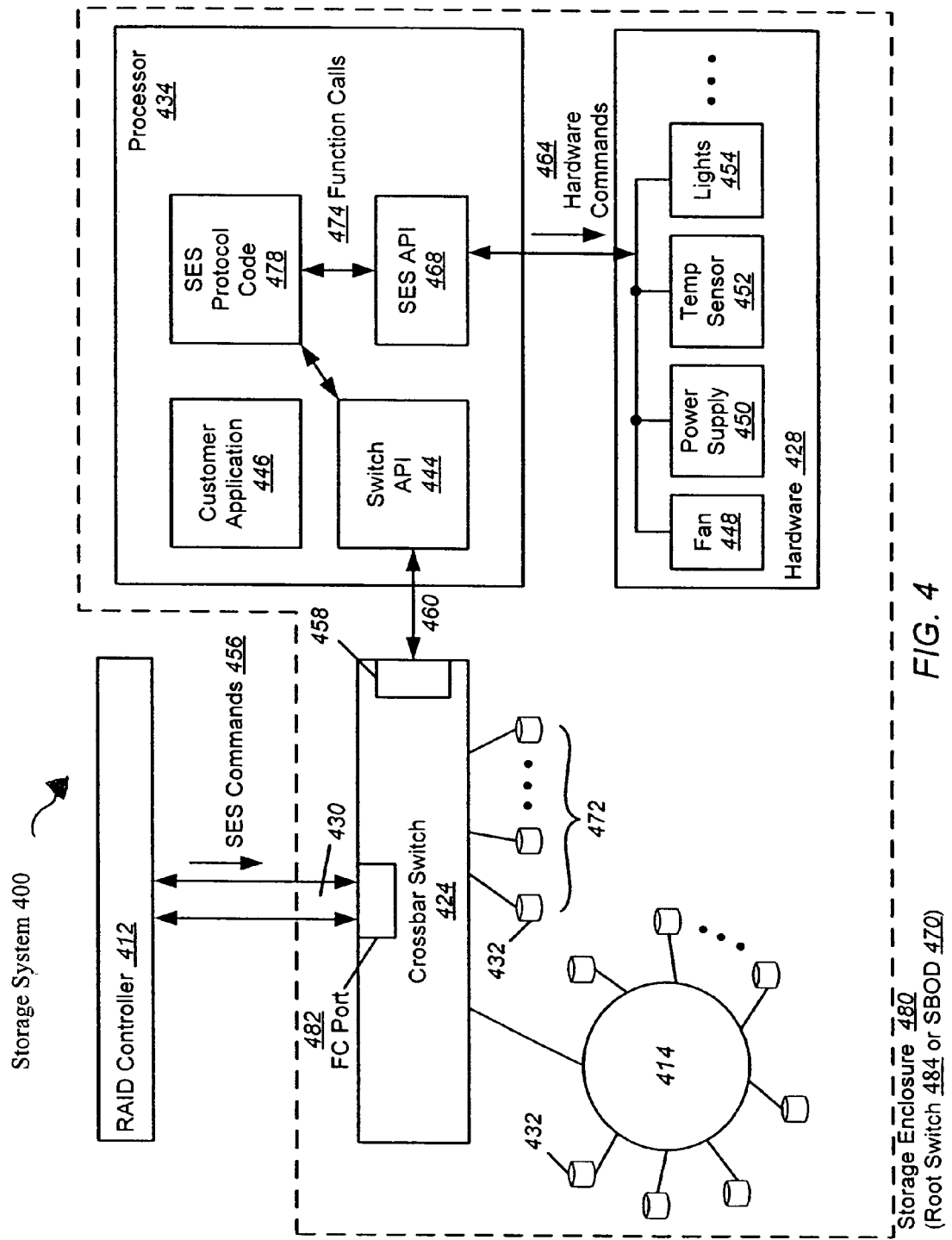
FIG. 4 illustrates an exemplary storage system including a processor for implementing a SES API to abstract the SES protocol code from the control and configuration the enclosure hardware according to embodiments of the present invention.

FIG. 4 illustrates an exemplary storage system 400 including a crossbar switch 424 and a processor 434 selected for controlling the crossbar switch 424 and for implementing a SES API 468 to abstract SES protocol code 478 from the configuration, monitoring and control of non-SCSI storage enclosure hardware 428 according to embodiments of the present invention. Non-SCSI storage enclosure hardware 428 may comprise a number of devices, including, but not limited to, one or more fans or cooling devices 448, power supplies 450, temperature sensors 452, and lights, displays or indicators 454. Note that FIG. 4 is generalized, wherein storage enclosure 480 is intended to represent the crossbar switch 424 in either a root switch implementation 484 (see drives 432 configured as a JBOD 414) or an SBOD implementation 470 (see drives 432 configured as an SBOD 472).

Processor 434 includes a switch API 444, which is source code and hardware drivers that allows the processor 434 to make and receive function calls, control the crossbar switch 424, and generally communicate with the crossbar switch 424. Processor 434 also includes a customer application 446 for controlling the operation of the crossbar switch 424 and the root switch 484 or SBOD 470.

To configure, monitor and control the non-SCSI storage enclosure hardware 428, SES commands 456 are sent from a RAID controller 412 over a FC connection 430 to the crossbar switch 424 via a FC port 482. The SES commands 456 are SCSI commands embedded in the FC protocol, and may be used to manage and sense the state of the non-SCSI storage enclosure hardware 428. The SES commands 456 are then routed to internal port 458 on crossbar switch 424. Note that when the SES protocol code comes on-line it negotiates for an address on the loop. This address is referred to as an AL_PA. The internal port 458 in the switch is configured to recognize and respond to this AL_PA so when a frame is sent by the SES initiator to the SES device, the internal port 458 sees its AL_PA and grabs the frame. Thus, internal port 458 is directly connectable to the FC port 482, just like any other external port in the crossbar switch 424.

The connection between the internal port 458 and the processor 434 may be a serial bus 460 internal to the enclosure that provides a communication link between integrated circuits, such as the Inter-Integrated Circuit (I²C) protocol, or it may be a parallel connection. Note that previous systems did not contain an internal port 458, making it impossible to access the processor 434 through the FC link 430, and making it impossible to respond to SES commands in the processor 434. The switch API 444 then receives the SES commands 456 from the crossbar switch 424, and forwards the SES commands 456 to SES protocol code 478.

In general, the SES protocol code 478 enables the processor 434 to appear as a SES device to the RAID controller 412. For a SCSI device to appear on a FC loop, it needs to understand and process certain SCSI level protocol operations. For example, a HBA may send a "test unit ready" command to a SCSI device, and the SCSI device must be able to return either a yes or no. The SES protocol code 478 understands the SCSI protocol and how to transport information across a FC link, and is responsive to the SES commands 456. In particular, the SES protocol code 478 defines 21 devices with specific operational capabilities that can be controlled, such as temperature sensors, cooling elements, power supplies, door locks, uninterruptible power supplies, keypads, displays, and the like. For example, a temperature sensor may provide a storage enclosure temperature, a power supply may provide an undervoltage or overvoltage indication, and a door lock can be commanded to lock or unlock. There are also a group of end user defined devices that the end user can tailor to configure, monitor and control any type of hardware in the storage enclosure. Note that there is no link between the customer application 446 and the SES protocol code 478, and therefore there is no control of the SES protocol code 478 from the customer application 446.

The SES protocol code 478 has no knowledge of the specific non-SCSI storage enclosure hardware 428, and is therefore not capable of directly configuring, monitoring or controlling the non-SCSI storage enclosure hardware 428. However, this specific knowledge is not necessary. To perform the operation specified by a SES command 456, the SES protocol code converts the SES command 456 to a series of C function calls, such as "get temperature," or "get speed of fan," or the like. These C function calls make up the SES API 468. For example, if a SES command 456 seeks to read the temperature within the storage enclosure 480, the SES protocol code 478 issues a series of SES API 478 C function calls.

The SES API 468 includes a customer-tailored interface library of C functions. This library allows the end user to specify to the SES protocol code 478 what non-SCSI hardware devices 428 are supported and what state they are in (e.g. alerts, values, existence). The library also allows the end user to provide the hardware interface routines necessary for SES to control their implementation in the storage enclosure 480. In addition to interfacing to hardware, the SES API 468 allows an end user to create vendor-defined mode, inquiry, and diagnostic pages as well as fill vendor-defined fields on other pages. Note that there are certain commands in SCSI that allow an initiator to read back information from the target. One of these is the MODE SENSE command. The information that can be returned by the MODE SENSE command is separated into logical groups of related data named pages. The initiator specifies which page of data it wishes to have returned. The INQUIRY command and the READ DIAGNOSTICS RESULTS command also support this. Pages are logical groupings of data.

In general, the SES API 468 may include functions to (1) query the existence of an enclosure element, (2) query the status of an enclosure element, (3) control an enclosure element, (4) query the existence of a sub-enclosure, and (5) query and control elements in a sub-enclosure. To support additional vendor-defined mode pages, the SES API 468 may include functions to (5) query the existence of vendor-defined mode pages, (6) read vendor-defined mode pages, (7) write vendor-defined mode pages, and (8) fill in various vendor-defined fields in standard mode pages. To support additional vendor-defined diagnostics pages, the SES API 468 may include functions to (9) query the existence of vendor-defined diagnostics pages, (10) read vendor-defined mode pages, and (11) write vendor-defined mode pages. To support additional vendor-defined inquiry pages, the SES API 468 may include functions to (12) query the existence of vendor-defined Inquiry pages, and (13) read vendor-defined Inquiry pages.

When the SES API 478 C functions are called from the SES protocol code 478, it executes the corresponding functions, which have been tailored for the specific hardware in the storage enclosure 480. For example, the functions may request temperature data from a specific temperature sensor 452 in the storage enclosure 480. When the temperature data is returned to the function, the data is passed back to the SES protocol code 478, which then prepares SES commands containing the temperature reading. These SES commands are sent back to the RAID controller 412 via the switch API 444 and crossbar switch 424.

The functions in the SES API 468 are written as templates or starting points, separate from the SES protocol code 478, so that end users can modify the functions in the SES API 468 to communicate with and control the particular non-SCSI storage enclosure hardware 428 in the hardware enclosure 480, without having to modify or even understand the SES protocol code 478. As noted above, previous systems integrated the SES API functionality within the SES protocol code, making it extremely difficult for end users to modify the SES protocol code in accordance with the particular non-SCSI storage enclosure hardware in the hardware enclosure.

However, embodiments of the present invention separate the SES API 468 from the SES protocol code 478, so that end users need not understand the SES protocol. The SES protocol code 478 is FC and SES protocol specific, and defines the format of each frame and field and record that comes across the FC link. On the other hand, the non-SCSI storage enclosure hardware 428 may not conform to any protocol, yet may require a particular format for enabling communications with that hardware 428 via hardware commands 464. By separating the SES API 468 from the SES protocol code 478, the SES protocol code 478 need not know the particular format for the hardware 428, and the hardware 428 need not understand the SES protocol code 478.

For example, suppose there is a 4-byte representation of a temperature level that has been requested in a SES command 456. When the SES protocol code 478 receives the SES command 456, it issues a series of SES API 468 function calls, requesting the temperature level from a temperature sensor. The C function calls 474, which have been previously tailored by the end user for the specific temperature sensor 452 employed in the storage enclosure 480, will retrieve the temperature level from the temperature sensor 452 and return a 32-bit entity referred to as an "unsigned long" that indicates the temperature level to the SES protocol code 478. The SES protocol code 478 takes this unsigned long and puts it back in the record in the proper location. It should be understood that the end user does not have to know this format. The end user only needs to be able to modify the functions in the SES API 468 in accordance with the specific non-SCSI storage enclosure hardware 428.

The SES API 468 supports everything that the SES protocol code 478 can control, and the SES protocol code 478 is very flexible. In addition to a set of defined function calls, there is a group of get and set vendor-defined functions that can be modified for use with any type of hardware. When data is returned from one of these functions, the SES protocol code 478 does not know what the data represents, but it sends it back anyway. An exemplary set of C function calls is provided in Table I below.

TABLE I

SES API FUNCTIONS

| Function name | Description |
| --- | --- |
| sapi_initializeElementClasses | This function will be called during initialization. The purpose of this function is to allow the Vendor the opportunity to register all of the element classes with the SES code. |
| sapi_modePageExists | This function is called to determine if a particular mode page exists (i.e., supported). |
| sapi_readVendorSpecificModePage | Mode pages 0x00 and 0x20-0x3E are vendor specific. This function is called to read one of these mode pages. |
| sapi_writeVendorSpecificModePage | Mode pages 0x00 and 0x20-0x3E are vendor specific. This function is called to write one of these mode pages. |
| sapi_inquiryPageExists | This function is called to determine if a particular inquiry page exists (i.e., supported). |
| sapi_readVendorSpecificInquiryPage | Inquiry pages 0xC0-0xFF are vendor specific. This function is called to read one of these inquiry pages |
| sapi_getSESDeviceInfo | This function is used to gather information about the SES Device for the Standard Inquiry Data Page. |
| sapi_readStdInquiryDataVendorSpecificField2 | This function is called to fill in the second Vendor Specific field in the Standard Inquiry Data Page (starting at byte 96 of the Standard Inquiry page). |
| sapi_getFRUInformation | This function is used to gather information for the ASCII Information page, INQUIRY pages 0x01-0x7f. The ASCII information page contains information for the field replaceable unit code returned in the REQUEST SENSE data. |
| sapi_getProductSerialNumber | This function is used to gather information for the Unit Serial Number page, INQUIRY page 0x80. This should be the serial number of the SES Device and not the enclosure's serial number. |
| sapi_getOperatingDefinitionDescription | This function is used to gather the ASCII Implemented Operating Definition data used to fill in the Inquiry page 0x82. |
| sapi_getOperatingVendorSpecificDescription | This function is used to gather the Vendor Specific Information used to fill in the Inquiry page 0x82. |
| sapi_getDeviceID | This function is used to gather information for the Device Identification page, INQUIRY page 0x83. The device identification page provides the means to retrieve zero or more identification descriptors applying to the logical unit. |

TABLE I-continued

SES API FUNCTIONS

| Function name | Description |
|---|---|
| sapi_runSelfTest | This function is called when the SelfTest bit is set to one in the Send Diagnostic command. Perform the target's default self test. |
| sapi_diagnosticPageExists | This function is called to determine if a particular diagnostic page exists (i.e. supported). |
| sapi_getEnclosureInfo | This function is used to gather information about the sub-enclosures for the Configuration page. Diagnostic page 0x01. |
| sapi_getTypeDescriptorText | This function is used to gather information about the element classes for the Configuration page. Diagnostic page 0x01. |
| sapi_getHelpText | The enclosure services help text page contains a string of characters from the enclosure that describes the present state of the enclosure and provides text indicating what corrective actions, if any, are desirable to bring the enclosure to its fully operational state. |
| sapi_stringOut | The enclosure services string out page transmits an enclosure dependent binary string from the application client to the enclosure services process. |
| sapi_stringIn | The enclosure services string in page transmits an enclosure dependent binary string from the enclosure services process to the application client. |
| sapi_setThresholds | The threshold out page is transmitted to the enclosure services process to establish threshold values for those elements that have limit sensing capability, for example voltage sensors, current sensors, and temperature sensors. This function is used to set the threshold for a particular element class. |
| sapi_getThresholds | The threshold in page is transmitted from the enclosure services process to the application client to report the actual threshold values for those elements that have limit sensing capability, for example voltage sensors, current sensors, and temperature sensors. |
| sapi_getElementDescriptorText | This function is called to fill in the Element Descriptor Page (Page 0x07). |
| sapi_getShortStatus | This function is called to fill in the enclosure Status of the Short Enclosure Status Page (Page 0x08). |
| sapi_readVendorSpecific DiagPage | Diagnostic pages 0x80-0xFF are vendor specific. This function is called to read one of these diagnostic pages. |
| sapi_writeVendorSpecific DiagPage | Diagnostic pages 0x80-0xFF are vendor specific. This function is called to write one of these diagnostic pages. |
| sapi_setUnspecified ElementControl | This function gets the status of the control variables for the "Unspecified" Element specified by the elementClassID, subEnclosureID and elementNumber. |
| sapi_getUnspecified ElementStatus | This function sets the control variables for the "Unspecified" Element specified by the elementClassID, subEnclosureID and elementNumber. |
| sapi_setDeviceElementControl | This function sets the control variables for the "Device" Element specified by the elementClassID, subEnclosureID and elementNumber. |
| sapi_getDeviceElementStatus | This function gets the status of control variables for the "Device" Element specified by the elementClassID, subEnclosureID, and elementNumber. |
| sapi_setDeviceElement ArrayControl | This function sets the control variables for the "Device" Element Array specified by the elementClassID, subEnclosureID and elementNumber. |
| sapi_getDeviceElement ArrayStatus | This function gets the status of control variables for the "Device" Element Array specified by the elementClassID, subEnclosureID, and elementNumber. |
| sapi_setPowerSupply ElementControl | This function gets the status of the control variables for the "Power Supply" Element specified by the elementClassID, subEnclosureID and elementNumber. |
| sapi_getPowerSupply ElementStatus | This function sets the control variables for the "Power Supply" Element specified by the elementClassID, subEnclosureID, and elementNumber. |
| sapi_setCooling ElementControl | This function gets the status of the control variables for the "Cooling" Element specified by the elementClassID, subEnclosureID, and elementNumber. |
| sapi_getCoolingElementStatus | This function sets the control variables for the "Cooling" Element specified by the elementClassID, subEnclosureID, and elementNumber. |
| sapi_setTemperature ElementControl | This function gets the status of the control variables for the "Temperature" Element specified by the elementClassID, subEnclosureID, and elementNumber. |

TABLE I-continued

SES API FUNCTIONS

| Function name | Description |
|---|---|
| sapi_getTemperatureElementStatus | This function sets the control variables for the "Temperature" Element specified by the elementClassID, subEnclosureID, and elementNumber. |
| sapi_setDoorlockElementControl | This function gets the status of the control variables for the "Doorlock" Element specified by the elementClassID, subEnclosureID, and elementNumber. |
| sapi_getDoorlockElementStatus | This function sets the control variables for the "Doorlock" Element specified by the elementClassID, subEnclosureID, and elementNumber. |
| sapi_setAudibleAlarmElementControl | This function gets the status of the control variables for the "Audible Alarm" Element specified by the elementClassID, subEnclosureID, and elementNumber. |
| sapi_getAudibleAlarmElementStatus | This function sets the control variables for the "Audible Alarm" Element specified by the elementClassID, subEnclosureID, and elementNumber. |
| sapi_setESControllerElementControl | This function gets the status of the control variables for the "Enclosure Services Controller" Element specified by the elementClassID, subEnclosureID and elementNumber. |
| sapi_getESControllerElementStatus | This function sets the control variables for the "Enclosure Services Controller" Element specified by the elementClassID, subEnclosureID and elementNumber. |
| sapi_setSCCControllerElementControl | This function gets the status of the control variables for the "ECC Controller" Element specified by the elementClassID, subEnclosureID and elementNumber. |
| sapi_getSCCControllerElementStatus | This function sets the control variables for the "SCC Controller" Element specified by the elementClassID, subEnclosureID, and elementNumber. |
| sapi_setNVCacheElementControl | This function gets the status of the control variables for the "Nonvolatile Cache" Element specified by the elementClassID, subEnclosureID and elementNumber. |
| sapi_getNVCacheElementStatus | This function sets the control variables for the "Nonvolatile Cache" Element specified by the elementClassID, subEnclosureID, and elementNumber. |
| sapi_setUninterruptiblePSElementControl | This function gets the status of the control variables for the "Uninterruptible Power Supply" Element specified by the elementClassID, subEnclosureID, and elementNumber. |
| sapi_getUninterruptiblePSElementStatus | This function sets the control variables for the "Uninterruptible Power Supply" Element specified by the elementClassID, subEnclosureID and elementNumber. |
| sapi_setDisplayElementControl | This function gets the status of the control variables for the "Display" Element specified by the elementClassID, subEnclosureID, and elementNumber. |
| sapi_getDisplayElementStatus | This function sets the control variables for the "Display" Element specified by the elementClassID, subEnclosureID, and elementNumber. |
| sapi_setKeypadElementControl | This function gets the status of the control variables for the "Keypad" Element specified by the elementClassID, subEnclosureID, and elementNumber. |
| sapi_getKeypadElementStatus | This function sets the control variables for the "Keypad" Element specified by the elementClassID, subEnclosureID, and elementNumber. |
| sapi_setPortTransElementControl | This function gets the status of the control variables for the "SCSI Port/Transceiver" Element specified by the elementClassID, subEnclosureID, and elementNumber. |
| sapi_getPortTransElementStatus | This function sets the control variables for the "SCSI Port/Transceiver" Element specified by the elementClassID, subEnclosureID, and elementNumber. |
| sapi_setLanguageElementControl | This function gets the status of the control variables for the "Language" Element specified by the elementClassID, subEnclosureID, and elementNumber. |
| sapi_getLanguageElementStatus | This function sets the control variables for the "Language" Element specified by the elementClassID, subEnclosureID, and elementNumber. |
| sapi_setCommunicationPortElementControl | This function gets the status of the control variables for the "Communication Port" Element specified by the elementClassID, subEnclosureID and elementNumber. |
| sapi_getCommunicationPortElementStatus | This function sets the control variables for the "Communication Port" Element specified by the elementClassID, subEnclosureID, and elementNumber. |
| sapi_setVoltageSensorElementControl | This function gets the status of the control variables for the "Voltage Sensor" Element specified by the elementClassID, subEnclosureID and elementNumber. |
| sapi_getVoltageSensorElementStatus | This function sets the control variables for the "Voltage Sensor" Element specified by the elementClassID, subEnclosureID, and elementNumber. |

TABLE I-continued

SES API FUNCTIONS

| Function name | Description |
|---|---|
| sapi_setCurrentSensor ElementControl | This function gets the status of the control variables for the "Current Sensor" Element specified by the elementClassID, subEnclosureID and elementNumber. |
| sapi_getCurrentSensor ElementStatus | This function sets the control variables for the "Current Sensor" Element specified by the elementClassID, subEnclosureID, and elementNumber. |
| sapi_setTargetPort ElementControl | This function gets the status of the control variables for the "SCSI Target Port" Element specified by the elementClassID, subEnclosureID and elementNumber. |
| sapi_getTargetPort ElementStatus | This function sets the control variables for the "SCSI Target Port" Element specified by the elementClassID, subEnclosureID, and elementNumber. |
| sapi_setInitiatorPort ElementControl | This function gets the status of the control variables for the "SCSI Initiator Port" Element specified by the elementClassID, subEnclosureID and elementNumber. |
| sapi_getInitiatorPort ElementStatus | This function sets the control variables for the "Initiator Port" Element specified by the elementClassID, subEnclosureID, and elementNumber. |
| sapi_setSimpleSubEnclosure ElementControl | This function gets the status of the control variables for the "Simple Sub-Enclosure" Element specified by the elementClassID, subEnclosureID and elementNumber. |
| sapi_getSimpleSubEnclosure ElementStatus | This function sets the control variables for the "Simple Sub-Enclosure" Element specified by the elementClassID, subEnclosureID, and elementNumber. |
| sapi_setVendorSpecific ElementControl | This function gets the status of the control variables for the "Vendor Specific" Element specified by the elementClassID, subEnclosureID, elementNumber, and elementType. |
| sapi_getVendorSpecific ElementStatus | This function sets the control variables for the "Vendor Specific" Element specified by the elementClassID, subEnclosureID, elementNumber, and elementType. |
| sapi_vendorImplemented ScsiCmd | This function is called for all SCSI commands received that are not implemented by the SES code. This allows the vendor to implement additional SCSI commands if desired. |

One of the advantages of this invention (the user-configurable SES API) is its upgradeability. Once the end user has invested the time to modify the template and generate functions specific to particular hardware, the processor and crossbar switch may be upgraded, and yet the same tailored SES API can be used with those upgraded devices to configure, monitor and control the same storage enclosure hardware.

Another advantage is that the SES protocol code 478 further allows an end user to verify that the RAID controller 412 "sees" the processor 434 as a SES device. Once the storage enclosure 480 is connected to the RAID controller 412, an end user can verify that the processor 434 appears as a SES device to the RAID controller 412. This step enables the end user to verify that a functioning SES device exists, and that the FC link to that device is also operational. Thereafter, functionality can be added to the SES API 468 to enable it to control and configure the non-SCSI storage enclosure hardware 428, confident that the SES protocol code 478 is operational.

Yet another advantage is that because the processor 434 relies on the crossbar switch 424 to provide a connection to the FC link, the processor 434 need not have FC ports, and it can be substantially less expensive than other processors previously used such as the Vitesse® VSC120. In addition, because the control of the non-SCSI storage enclosure hardware 428 is implemented in firmware, a processor may be chosen for the hardware enclosure 480 that fits the particular application.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for providing device-independent control of storage enclosure hardware using a SCSI Enclosure Services (SES) protocol, comprising:
   storing user-configurable functions tailored to the storage enclosure hardware in a SES Application Programming Interface (API) within a storage enclosure containing the storage enclosure hardware;
   receiving a SES command for controlling one or more general hardware operational capabilities from a RAID controller by a processor within the storage enclosure;
   converting the SES command to a series of function calls in accordance with SES protocol code within the storage enclosure; and
   identifying from the user-configurable functions a series of functions corresponding to the series of function calls and executing the series of functions in the SES API to control specific non-SCSI storage enclosure hardware,
   wherein the user-configurable functions tailored to the storage enclosure hardware comprise one or more functions for performing operations selected from the group consisting of
   querying the existence of an enclosure element, querying the status of an enclosure element, controlling an enclosure element, querying the existence of a sub-enclosure, querying and controlling elements in a sub-enclosure, querying the existence of vendor-defined mode pages, reading vendor-defined mode pages, writing vendor-defined mode pages, filling in various vendor-defined fields in standard mode pages, querying the existence of vendor-defined diagnostics pages, reading vendor-defined mode pages, writing vendor-defined mode pages, querying the existence of vendor-defined Inquiry pages, and reading vendor-defined Inquiry pages.

2. The method as recited in claim 1, further comprising:
routing the SES command through an internal port on a crossbar switch before converting the SES command to a series of function calls.

3. A method for providing abstracted control of storage enclosure hardware using a SCSI Enclosure Services (SES) protocol, comprising:
storing user-configurable functions tailored to the storage enclosure hardware in a SES Application Programming Interface (API) within a storage enclosure containing the storage enclosure hardware;
receiving a SES command for controlling one or more general hardware operational capabilities from a RAID controller by a processor within the storage enclosure;
converting the SES command to a series of function calls in accordance with SES protocol code within the storage enclosure; and
identifying from the user-configurable functions a series of functions corresponding to the series of function calls and executing the series of functions in the SES API to control specific non-SCSI storage enclosure hardware,
wherein the user-configurable functions tailored to the storage enclosure hardware comprise one or more functions for performing operations selected from the group consisting of
sapi_initializeElementClasses, sapi_modePageExists, sapi_readVendorSpecificModePage,
sapi_writeVendorSpecificModePage, sapi_inquiryPageExists,
sapi_readVendorSpecificInquiryPage, sapi_getSESDeviceInfo,
sapi_readStdInquiryDataVendorSpecificField2, sapi_getFRUInformation,
sapi_getProductSerialNumber, sapi_getOperatingDefinitionDescription,
sapi_getOperatingVendorSpecificDescription, sapi_getDeviceID, sapi_runSelfTest,
sapi_diagnosticPageExists, sapi_getEnclosureInfo, sapi_getTypeDescriptorText,
sapi_getHelpText, sapi_stringOut, sapi_stringIn, sapi_setThresholds, sapi_getThresholds,
sapi_getElementDescriptorText, sapi_getShortStatus, sapi_readVendorSpecificDiagPage,
sapi_writeVendorSpecificDiagPage, sapi_setUnspecifiedElementControl,
sapi_getUnspecifiedElementStatus, sapi_setDeviceElementControl,
sapi_getDeviceElementStatus, sapi_setDeviceElementArrayControl,
sapi_getDeviceElementArrayStatus, sapi_setPowerSupplyElementControl,
sapi_getPowerSupplyElementStatus, sapi_setCoolingElementControl,
sapi_getCoolingElementStatus, sapi_setTemperatureElementControl,
sapi_getTemperatureElementStatus, sapi_setDoorlockElementControl,
sapi_getDoorlockElementStatus, sapi_setAudibleAlarmElementControl,
sapi_getAudibleAlarmElementStatus, sapi_setESControllerElementControl,
sapi_getESControllerElementStatus, sapi_setSCCControllerElementControl,
sapi_getSCCControllerElementStatus, sapi_setNVCacheElementControl,
sapi_getNVCacheElementStatus, sapi_setUninterruptiblePSElementControl,
sapi_getUninterruptiblePSElementStatus, sapi_setDisplayElementControl,
sapi_getDisplayElementStatus, sapi_setKeypadElementControl,
sapi_getKeypadElementStatus, sapi_setPortTransElementControl,
sapi_getPortTransElementStatus, sapi_setLanguageElementControl,
sapi_getLanguageElementStatus, sapi_setCommunicationPortElementControl,
sapi_getCommunicationPortElementStatus, sapi_setVoltageSensorElementControl,
sapi_getVoltageSensorElementStatus, sapi_setCurrentSensorElementControl,
sapi_getCurrentSensorElementStatus, sapi_setTargetPortElementControl,
sapi_getTargetPortElementStatus, sapi_setInitiatorPortElementControl,
sapi_getInitiatorPortElementStatus, sapi_setSimpleSubEnclosureElementControl,
sapi_getSimpleSubEnclosureElementStatus, sapi_setVendorSpecificElementControl,
sapi_getVendorSpecificElementStatus, and sapi_setvendorImplementedScsiCmd.

4. The method as recited in claim 3, further comprising:
routing the SES command through an internal port on a crossbar switch before converting the SES command to a series of function calls.

5. A computer-readable medium comprising SCSI Enclosure Services (SES) protocol program code, the program code for causing a processor within a storage enclosure of a storage device to perform a method comprising:
receiving a SES command for controlling one or more general hardware operational capabilities from a RAID controller; and
converting the SES command to a series of function calls corresponding to at least one or more user-configurable functions within a SES Application Programming Interface (API) that are tailored to control specific non-SCSI storage enclosure hardware within the storage enclosure and configured to perform operations selected from the group consisting of
querying the existence of an enclosure element, querying the status of an enclosure element, controlling an enclosure element, querying the existence of a sub-enclosure, querying and controlling elements in a sub-enclosure, querying the existence of vendor-defined mode pages, reading vendor-defined mode pages, writing vendor-defined mode pages, filling in various vendor-defined fields in standard mode pages, querying the existence of vendor-defined diagnostics pages, reading vendor-defined mode pages, writing vendor-defined mode pages, querying the existence of vendor-defined Inquiry pages, and reading vendor-defined Inquiry pages,
wherein the SES command is converted to the series of function calls in accordance with SES protocol code within the storage enclosure, and
wherein the API is within the storage enclosure, configured to store user-configurable functions tailored to control any non-SCSI storage enclosure hardware with the storage enclosure, and further configured to execute the one or more user-configurable functions in response to the series of functional calls.

6. A computer-readable medium comprising SCSI Enclosure Services (SES) protocol program code, the program code for causing a processor within a storage enclosure of a storage device to perform a method comprising:
receiving a SES command for controlling one or more general hardware operational capabilities from a RAID controller; and
converting the SES command to a series of function calls corresponding to at least one or more user-configurable functions within a SES Application Programming Interface (API) that are tailored to control specific non-SCSI storage enclosure hardware within the storage enclosure and configured to perform operations selected from the group consisting of
sapi_initializeElementClasses, sapi_modePageExists, sapi_readVendorSpecificModePage,
sapi_writeVendorSpecificModePage, sapi_inquiryPateExists,
sapi_readVendorSpecificInquiryPage, sapi_getSESDeviceInfo,
sapi_readStdInquiryDataVendorSpecificField2, sapi_getFRUInformation,
sapi_getProductSerialNumber, sapi_getOperatingDefinitionDescription,
sapi_getOperatingVendorSpecificDescription, sapi_getDeviceID, sapi_runSelfTest,
sapi_diagnosticPageExists, sapi_getEnclosureInfo, sapi_getTypeDescriptorText,
sapi_getHelpText, sapi_stringOut, sapi_stringIn, sapi_setThresholds, sapi_getThresholds,
sapi_getElementDescriptorText, sapi_getShortStatus, sapi_readVendorSpecificDiagPage,
sapi_writeVendorSpecificDiagPage, sapi_setUnspecifiedElementControl,
sapi_getUnspecifiedElementStatus, sapi_setDeviceElementControl,
sapi_getDeviceElementStatus, sapi_setDeviceElementArrayControl,
sapi_getDeviceElementArrayStatus, sapi_setPowerSupplyElementControl,
sapi_getPowerSupplyElementStatus, sapi_setCoolingElementControl,
sapi_getCoolingElementStatus, sapi_setTemperatureElementControl,
sapi_getTemperatureElementStatus, sapi_setDoorlockElementControl,
sapi_getDoorlockElementStatus, sapi_setAudibleAlarmElementControl,
sapi_getAudibleAlarmElementStatus, sapi_setESControllerElementControl,
sapi_getESControllerElementStatus, sapi_setSCCControllerElementControl,
sapi_getSCCControllerElementStatus, sapi_setNVCacheElementControl,
sapi_getNVCacheElementStatus, sapi_setUninterruptiblePSElementControl,
sapi_getUninterruptiblePSElementStatus, sapi_setDisplayElementControl,
sapi_getDisplayElementStatus, sapi_setKeypadElementControl,
sapi_getKeypadElementStatus, sapi_setPortTransElementControl,
sapi_getPortTransElementStatus, sapi_setLanguageElementControl,
sapi_getLanguageElementStatus, sapi_setCommunicationPortElementControl,
sapi_getCommunicationPortElementStatus, sapi_setVoltageSensorElementControl,
sapi_getVoltageSensorElementStatus, sapi_setCurrentSensorElementControl,
sapi_getCurrentSensorElementStatus, sapi_setTargetPortElementControl,
sapi_getTargetPortElementStatus, sapi_setInitiatorPortElementControl,
sapi_getInitiatorPortElementStatus, sapi_setSimpleSubEnclosureElementControl,
sapi_getSimpleSubEnclosureElementStatus, sapi_setVendorSpecificElementControl,
sapi_getVendorSpecificElementStatus, and sapi_vendorImplementedScsiCmd,
wherein the SES command is converted to the series of function calls in accordance with SES protocol code within the storage enclosure, and
wherein the API is within the storage enclosure, configured to store user-configurable functions tailored to control any non-SCSI storage enclosure hardware with the storage enclosure, and further configured to execute the one or more user-configurable functions in response to the series of functional calls.

7. In a storage enclosure for connecting networked storage devices, the storage enclosure including non-SCSI storage enclosure hardware, one or more processors programmed for providing device-independent control of the non-SCSI storage enclosure hardware using a SCSI Enclosure Services (SES) protocol by performing the steps of:
storing user-configurable functions tailored to the storage enclosure hardware in a SES Application Programming Interface (API) within a storage enclosure containing the storage enclosure hardware;
receiving a SES command for controlling one or more general hardware operational capabilities from a RAID controller by a processor within the storage enclosure;
converting the SES command to a series of function calls in accordance with SES protocol code within the storage enclosure; and
identifying from the user-configurable functions a series of functions corresponding to the series of function calls and executing the series of functions in the SES API to control specific non-SCSI storage enclosure hardware,
wherein the user-configurable functions tailored to the storage enclosure hardware comprise one or more functions for performing operations selected from the group consisting of
querying the existence of an enclosure element, querying the status of an enclosure element, controlling an enclosure element, querying the existence of a sub-enclosure, querying and controlling elements in a sub-enclosure, querying the existence of vendor-defined mode pages, reading vendor-defined mode pages, writing vendor-defined mode pages, filling in various vendor-defined fields in standard mode pages, querying the existence of vendor-defined diagnostics pages, reading vendor-defined mode pages, writing vendor-defined mode pages, querying the existence of vendor-defined Inquiry pages, and reading vendor-defined Inquiry pages.

8. A storage area network (SAN) comprising the storage enclosure of claim 7.

9. In a storage enclosure for connecting networked storage devices, the storage enclosure including non-SCSI storage enclosure hardware, one or more upgradeable processors programmed for providing abstracted control of the non-SCSI storage enclosure hardware using a SCSI Enclosure Services (SES) protocol by performing the steps of:
- storing user-configurable functions tailored to the storage enclosure hardware in a SES Application Programming Interface (API) within a storage enclosure containing the storage enclosure hardware;
- receiving a SES command for controlling one or more general hardware operational capabilities from a RAID controller by a processor within the storage enclosure;
- converting the SES command to a series of function calls in accordance with SES protocol code within the storage enclosure; and
- identifying from the user-configurable functions a series of functions corresponding to the series of function calls and executing the series of functions in the SES API to control specific non-SCSI storage enclosure hardware,
- wherein the user-configurable functions tailored to the storage enclosure hardware comprise one or more functions for performing operations selected from the group consisting of
sapi_initializeElementClasses, sapi_modePageExists, sapi_readVendorSpecificModePage, sapi_writeVendorSpecificModePage,
sapi_inquiryPageExists, sapi_readVendorSpecificInquiryPage, sapi_getSESDeviceInfo,
sapi_readStdInquiryDataVendorSpecificField2, sapi_getFRUInformation,
sapi_getProductSerialNumber, sapi_getOperatingDefinitionDescription,
sapi_getOperatingVendorSpecificDescription, sapi_getDeviceID, sapi_runSelfTest,
sapi_diagnosticPageExists, sapi_getEnclosureInfo, sapi_getTypeDescriptorText,
sapi_getHelpText, sapi_stringOut, sapi_stringIn, sapi_setThresholds,
sapi_getThresholds, sapi_getElementDescriptorText, sapi_getShortStatus,
sapi_readVendorSpecificDiagPage, sapi_writeVendorSpecificDiagPage,
sapi_setUnspecifiedElementControl, sapi_getUnspecifiedElementStatus,
sapi_setDeviceElementControl, sapi_getDeviceElementStatus,
sapi_setDeviceElementArrayControl, sapi_getDeviceElementArrayStatus,
sapi_setPowerSupplyElementControl, sapi_getPowerSupplyElementStatus,
sapi_setCoolingElementControl, sapi_getCoolingElementStatus,
sapi_setTemperatureElementControl, sapi_getTemperatureElementStatus,
sapi_setDoorlockElementControl, sapi_getDoorLockElementStatus,
sapi_setAudibleAlarmElementControl, sapi_getAudibleAlarmElementStatus,
sapi_setESControllerElementControl, sapi_getESControllerElementStatus,
sapi_setSCCControllerElementControl, sapi_getSCCControllerElementStatus,
sapi_setNVCacheElementControl, sapi_getNVCacheElementStatus,
sapi_setUninterruptiblePSElementControl, sapi_getUninterruptiblePSElementStatus,
sapi_setDisplayElementControl, sapi_getDisplayElementStatus,
sapi_setKeypaydElementControl, sapi_getKeypadElementStatus,
sapi_setPortTransElementControl, sapi_getPortTransElementStatus,
sapi_setLanguageElementControl, sapi_getLanguageElementStatus,
sapi_setCommunicationPortElementControl, sapi_getCommunicationPortElementStatus,
sapi_setVoltageSensorElementControl, sapi_getVoltageSensorElementStatus,
sapi_setCurrentSensorElementControl, sapi_getCurrentSensorElementStatus,
sapi_setTargetPortElementControl, sapi_getTargetPortElementStatus,
sapi_setInitiatorPortElementControl, sapi_getInitiatorPortElementStatus,
sapi_setSimpleSubEnclosureElementControl, sapi_getSimpleSubEnclosureElementStatus, sapi_setVendorSpecificElementControl,
sapi_getVendorSpecificElementStatus, and sapi_vendorImplementedScsiCmd.

10. A storage area network (SAN) comprising the storage enclosure of claim 9.

11. A SCSI Enclosure Services (SES) protocol code operable between two segments of software executable by a processor positioned within a storage enclosure of a storage system, the two segments including
- a first software segment for communicating via SES commands to a RAID controller of the storage system and
- a second software segment for communicating via a SES Application Programming Interface (API) to non-SCSI storage enclosure hardware within the storage enclosure, said second software segment containing user-configurable functions for controlling specific non-SCSI storage enclosure hardware,
- the SES protocol code stored in a computer-readable medium and characterized by having function calls for executing at least one or more of the functions stored in the second software segment and performing operations selected from the group consisting of:
- querying the existence of an enclosure element, querying the status of an enclosure element, controlling an enclosure element, querying the existence of a sub-enclosure, querying and controlling elements in a sub-enclosure, querying the existence of vendor-defined mode pages, reading vendor-defined mode pages, writing vendor-defined mode pages, filling in various vendor-defined fields in standard mode pages, querying the existence of vendor-defined diagnostics pages, reading vendor-defined mode pages, writing vendor-defined mode pages, querying the existence of vendor-defined Inquiry pages, and reading vendor-defined Inquiry pages.

12. A SCSI Enclosure Services (SES) protocol code operable between two segments of software executable by a processor positioned within a storage enclosure of a storage system, the two segments including
- a first software segment for communicating via SES commands to a RAID controller of the storage system and
- a second software segment for communicating via a SES Application Programming Interface (API) to non-SCSI storage enclosure hardware within the storage enclosure, said second software segment containing user-configurable functions for controlling specific non-SCSI storage enclosure hardware,
- the SES protocol code stored in a computer-readable medium and characterized by having function calls for executing at least one or more of the functions stored in the second software segment and performing operations selected from the group consisting of:

sapi_initializeElementClasses, sapi_modePageExists, sapi_readVendorSpecificModePage,
sapi_writeVendorSpecificModePage, sapi_inquiryPageExists,
sapi_readVendorSpecificInquiryPage, sapi_getSESDeviceInfo,
sapi_readStdInquiryDataVendorSpecificField2, sapi_getFRUInformation,
sapi_getProductSerialNumber, sapi_getOperatingDefinitionDescription,
sapi_getOperatingVendorSpecificDescription, sapi_getDeviceID, sapi_runSelfTest,
sapi_diagnosticPageExists, sapi_getEnclosureInfo, sapi_getTypeDescriptorText,
sapi_getHelpText, sapi_stringOut, sapi_stringIn, sapi_setThresholds, sapi_getThresholds,
sapi_getElementDescriptorText, sapi_getShortStatus, sapi_readVendorSpecificDiagPage,
sapi_writeVendorSpecificDiagPage, sapi_setUnspecifiedElementControl,
sapi_getUnspecifiedElementStatus, sapi_setDeviceElementControl,
sapi_getDeviceElementStatus, sapi_setDeviceElementArrayControl,
sapi_getDeviceElementArrayStatus, sapi_setPowerSupplyElementControl,
sapi_getPowerSupplyElementStatus, sapi_setCoolingElementControl,
sapi_getCoolingElementStatus, sapi_setTemperatureElementControl,
sapi_getTemperatureElementStatus, sapi_setDoorlockElementControl,
sapi_getDoorlockElementStatus, sapi_setAudibleAlarmElementControl,
sapi_getAudibleAlarmElementStatus, sapi_setESControllerElementControl,
sapi_getESControllerElementStatus, sapi_setSCCControllerElementControl,
sapi_getSCCControllerElementStatus, sapi_setNVCacheElementControl,
sapi_getNVCacheElementStatus, sapi_setUninterruptiblePSElementControl,
sapi_getUninterruptiblePSElementStatus, sapi_setDisplayElementControl,
sapi_getDisplayElementStatus, sapi_setKeypadElementControl,
sapi_getKeypadElementStatus,
sapi_setPortTransElementControl,
sapi_getPortTransElementStatus, sapi_setLanguageElementControl,
sapi_getLanguageElementStatus, sapi_setCommunicationPortElementControl,
sapi_getCommunicationPortElementStatus, sapi_setVoltageSensorElementControl,
sapi_getVoltageSensorElementStatus, sapi_setCurrentSensorElementControl,
sapi_getCurrentSensorElementStatus, sapi_setTargetPortElementControl,
sapi_getTargetPortElementStatus, sapi_setInitiatorPortElementControl,
sapi_getInitiatorPortElementStatus, sapi_setSimpleSubEnclosureElementControl,
sapi_getSimpleSubEnclosureElementStatus, sapi_SetVendorSpecificElementControl,
sapi_getVendorSpecificElementStatus, and sapi_vendorImplementedScsiCmd.

* * * * *